UNITED STATES PATENT OFFICE.

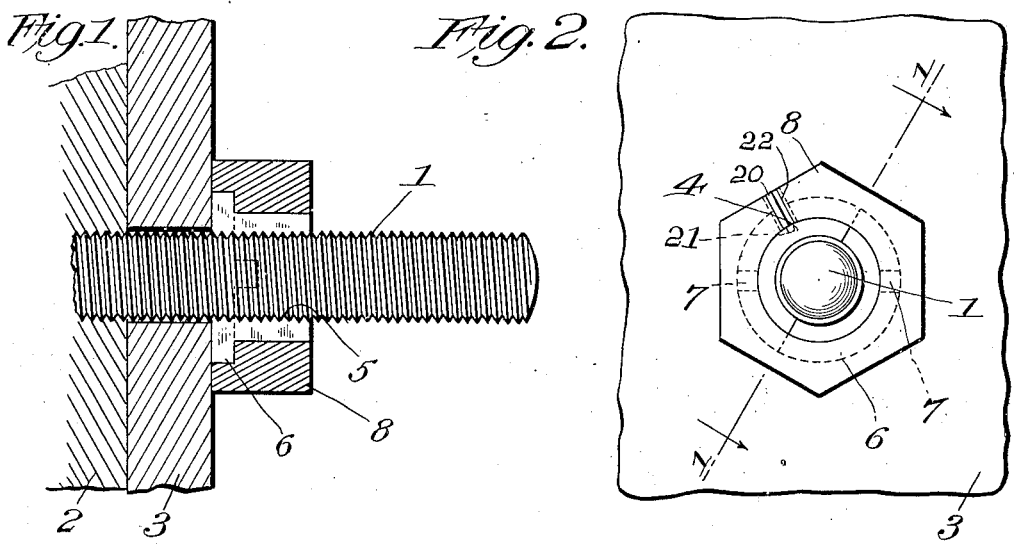
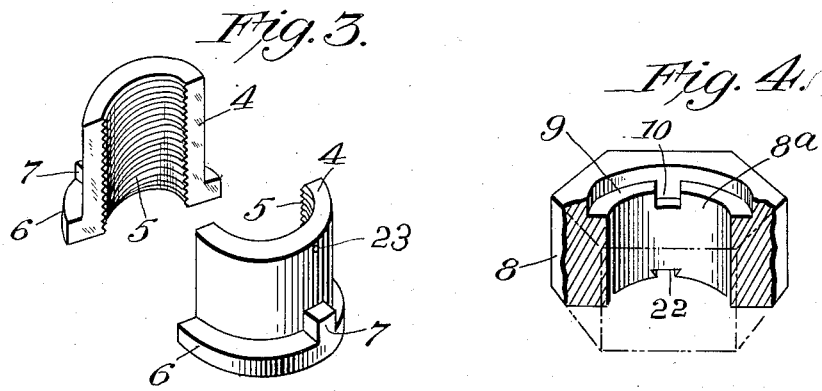
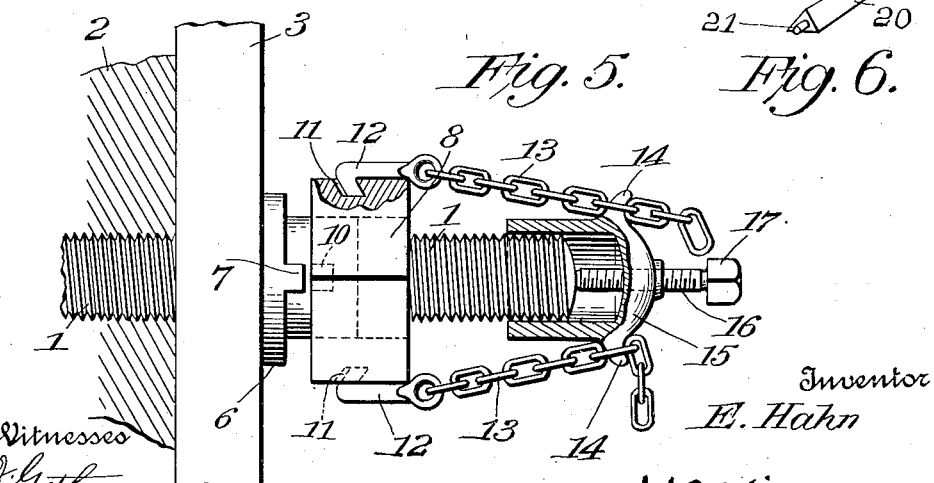

ELGY HAHN, OF MILWAUKEE, WISCONSIN.

NUT CONSTRUCTION.

1,062,000.  Specification of Letters Patent.  Patented May 20, 1913.

Application filed December 31, 1912. Serial No. 739,554.

*To all whom it may concern:*

Be it known that I, ELGY HAHN, citizen of the United States, residing at Milwaukee, in the county of Milwaukee and State of Wisconsin, have invented certain new and useful Improvements in Nut Constructions, of which the following is a specification.

The present invention relates to certain new and useful improvements in the construction of nuts such as are commonly employed in connection with bolts and other threaded fastening members, the object of the invention being to provide a nut of this character which embodies novel features of construction whereby the nut can be easily and quickly removed from the bolt should it become rusted upon or otherwise prevented from being unscrewed in the usual manner.

A further object of the invention is to provide a nut of this character which is comparatively simple and inexpensive in its construction, which can be assembled or taken apart, and which can be turned tightly into position in the usual manner.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a longitudinal sectional view through a nut constructed in accordance with the invention, the said nut being shown as applied to a bolt, and the said figure being taken on the line 1—1 of Fig. 2. Fig. 2 is a top plan view of a nut constructed in accordance with the invention, the said nut being shown as applied to a bolt. Fig. 3 is a detail perspective view of the two complemental nut members, the said members being separated. Fig. 4 is a detached perspective view of the polygonal collar within which the nut members are assembled, portions of the collar being broken away and shown in section. Fig. 5 is a side elevation of a nut and a device for withdrawing the polygonal collar from the nut sections, portions being broken away and shown in section to more clearly illustrate the invention, and Fig. 6 is a detail view of the locking pin.

Corresponding and like parts are referred to in the following description and indicated in all the views of the drawing by the same reference characters.

Specifically describing the present embodiment of the invention, the numeral 1 designates a threaded fastening member such as a bolt which is employed for holding the members 2 and 3 together. The nut with which the bolt 1 is capped comprises the two complemental nut members 4 which are adapted to be applied to the bolt from opposite sides thereof. These complemental nut sections 4 are substantially semi-cylindrical in shape, the inner faces thereof being hollowed out and threaded at 5 so as to engage the threads of the bolt 1 in the usual manner when the nut is properly assembled and fitted upon the bolt. One end of each of the nut sections 4 is provided with an outstanding flange 6, the two flanges producing a continuous annular flange around the nut when the members are assembled. It will also be observed that each of the nut sections 4 is provided with a lug 7 which is disposed at the base of the flange 6, the two lugs preferably having a diametrically opposed relation when the complemental nut sections are assembled. A collar 8 is adapted to be applied to the nut sections 4 to hold the same together, the said collar being formed with a cylindrical opening 8ª which is adapted to accurately receive the two semi-cylindrical nut sections 4. The exterior of the collar has an angular or polygonal formation so as to be readily engaged by a wrench or suitable tool for turning the nut into or out of position. One end of the bore 8ª of the collar is rabbeted at 9 to receive the flanges 6 of the nut sections, and diametrically opposed notches 10 are formed at the base of the said rabbet 9 for engagement with the lugs 7. The nut sections may be retained within the collar 8 in any suitable manner such as by being tightly fitted therein or by the use of some suitable adhesive, and the nut may then be applied to the bolt and turned into and out of position in the usual manner, the flanged ends of the nut sections 4 and the rabbeted end of the collar 8 always facing inwardly so as to bear against the member or object toward which the nut is turned.

Should the nut become rusted upon the bolt or otherwise stick or adhere to the bolt in such a manner that it is impossible to loosen and unscrew the same, as very frequently happens in railroad construction, it is merely necessary to forcibly withdraw the collar 8 from the two nut sections 4, after which the nut sections can be readily separated. For the purpose of enabling the collar to be readily withdrawn, sockets 11 are formed in oppositely disposed exterior faces thereof, the said sockets being adapted to be engaged by suitable hooks or claws 12. These hooks 12 may be connected to chains 13, suitable links of the chains being adapted to be engaged with fingers 14 projecting from a cap 15. This cap 15 is designed to be applied to the end of the bolt 1 and has a screw 16 threaded in the end thereof, the extremity of the screw bearing against the end of the bolt 1 and the head 17 of the screw having an angular formation. It will be obvious that by turning this screw 17 the cap 15 may be forced outwardly and the collar 8 of the nut thereby withdrawn from the nut sections 4. The nut sections can then be readily forced from the bolt, even though they may be rusted in position thereon.

As previously stated, any suitable means may be provided for holding the polygonal collar 8 in position upon the nut sections 4, although as shown upon the drawings a locking pin is provided for this purpose. This locking pin is formed with a body portion 20 having the shape of a triangular prism, a small pin 21 being provided which projects longitudinally from one end of the body portion 20. This prismatic body portion 20 is adapted to be fitted into a radially disposed dove-tail groove 22 provided in the outer face of the collar 8, and when the body portion 20 is in position, the small pin 21 enters an opening 23 in one of the nut sections 4. One of the edges of the prismatic body portion 20 projects outwardly from the face of the collar 8 so as to be engaged by a suitable tool for withdrawing the pin, although the pin 21 has a comparatively small cross section, so that even though the member may be firmly seated in position, the pin can be readily sheared when force is applied thereto, as by means of the jack device shown by Fig. 5.

Having thus described the invention, what I claim as new and desire to secure by Letters Patent, is:—

1. A nut including a pair of substantially semicylindrical nut sections provided with threaded inner faces adapted to engage the bolt, and also formed at one end thereof with a marginal flange, and a collar having a polygonal exterior and a substantially cylindrical bore adapted to receive the nut sections, one end of the bore being rabbeted to receive the flange of the nut sections, means being provided for securing an interlocking connection between the collar and the nut sections.

2. A nut including a pair of substantially semicylindrical nut sections provided with threaded inner faces and formed at one end thereof with an outstanding flange and also with a lug at the base of the flange, and a collar formed with a polygonal exterior and a substantially cylindrical bore adapted to receive the nut sections, one end of the bore being rabbeted to receive the outstanding flanges of the nut sections and sockets being formed at the base of the rabbeted portion to receive the before mentioned lugs of the nut sections.

3. The combination of a bolt, a series of complemental nut sections having threaded faces adapted to engage the bolt, a collar receiving the nut sections to hold the same together, claws adapted to engage the collar, a cap for the end of the bolt, means for connecting the nut engaging claws to the cap, and a screw carried by the cap for engagement with the end of the bolt for forcing the cap outwardly and withdrawing the collar from the nut sections.

4. A nut including complemental nut sections adapted to be applied to the bolt from the sides thereof, a collar adapted to receive the complemental nut sections for holding the same in operative position, and a locking pin carried by the collar for engagement with the nut sections to hold the collar positively in position.

5. A nut including complemental nut sections provided with threaded faces adapted to engage the bolt and to be applied thereto from opposite sides thereof, a collar adapted to be fitted upon the nut sections to hold the same in position, the said collar having a dove-tail groove in one end thereof, a locking member including a prismatic body portion adapted to be slipped into the dove-tail groove, and a pin at one end of the prismatic body portion adapted to engage one of the nut sections.

6. A nut formed in complemental sections adapted to be applied to the bolt from opposite sides thereof and formed with threaded faces adapted to engage the bolt, a collar adapted to be applied to the nut sections for holding the same in operative position, and a locking member including a body portion which is slidably mounted upon the collar, the said body portion being provided at one end thereof with a reduced pin which is adapted to engage one of the nut sections and which can be readily sheared when force is applied to the collar for removing the same.

In testimony whereof I affix my signature in presence of two witnesses.

ELGY HAHN.

Witnesses:
 FRANK J. GAPINSKI,
 MAX J. BROZEWSKI.